(12) United States Patent
Kawaguchi

(10) Patent No.: US 10,760,676 B2
(45) Date of Patent: Sep. 1, 2020

(54) DIFFERENTIAL APPARATUS

(71) Applicant: Honda Motor Co., Ltd., Tokyo (JP)

(72) Inventor: Yoshitaka Kawaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/298,454

(22) Filed: Mar. 11, 2019

(65) Prior Publication Data

US 2019/0293169 A1    Sep. 26, 2019

(30) Foreign Application Priority Data

Mar. 22, 2018 (JP) ................. 2018-054940

(51) Int. Cl.
*F16H 37/08* (2006.01)
*F16H 57/04* (2010.01)

(52) U.S. Cl.
CPC ......... *F16H 57/0457* (2013.01); *F16H 37/08* (2013.01); *F16H 57/0427* (2013.01); *F16H 57/0495* (2013.01)

(58) Field of Classification Search
CPC .. F16H 37/08; F16H 57/0427; F16H 57/0457; F16H 57/0495
USPC ........................................... 475/160
See application file for complete search history.

(56) References Cited

U.S. PATENT DOCUMENTS

| | | | |
|---|---|---|---|
| 1,874,646 A * | 8/1932 | Skinner | F16H 57/0427 184/13.1 |
| 1,950,034 A * | 3/1934 | Mulford | B60K 17/16 475/160 |
| 3,495,298 A * | 2/1970 | Engle | F16H 48/22 184/6.13 |
| 7,976,421 B2 * | 7/2011 | Nakajima | F16H 48/08 475/160 |
| 9,903,464 B2 * | 2/2018 | Mori | F16H 57/0427 |

FOREIGN PATENT DOCUMENTS

JP    2008082530 A    4/2008

* cited by examiner

*Primary Examiner* — Leslie A Nicholson, III
(74) *Attorney, Agent, or Firm* — Duft & Bornsen, PC

(57) ABSTRACT

A differential apparatus having a pinion gear revolving around an axial line and a side gear engaging with the pinion gear and configured to transmit power by rotation of the side gear, including: a differential case housing the pinion gear and the side gear and rotating around the axial line; and an intermediate member disposed between the side gear and an inner wall of the differential case. The intermediate member has a scooping-up portion scooping up oil outside of the differential case.

6 Claims, 6 Drawing Sheets

DIFFERENTIAL APPARATUS

CROSS-REFERENCE TO RELATED APPLICATION

This application is based upon and claims the benefit of priority from Japanese Patent Application No. 2018-054940 filed on Mar. 22, 2018, the content of which is incorporated herein by reference.

BACKGROUND OF THE INVENTION

Field of the Invention

This invention relates to a differential apparatus for transmitting power.

Description of the Related Art

There have been known apparatuses that supply oil scooped up by a rotating gear to a differential mechanism. Such an apparatus is described in, for example, Japanese Unexamined Patent Application Publication No. 2008-082530 (JP2008-082530A). The apparatus of JP2008-082530A includes an oil storage that stores oil scooped up by a gear and a closing mechanism that is opened and closed during start of the vehicle so that the oil in the oil storage flows down to a differential mechanism. Thus, the oil is supplied to the differential mechanism during start of the vehicle.

However, in the case of the apparatus of JP2008-082530A, the oil storage and closing mechanism are disposed separately from the differential mechanism, resulting in an increase in part count and upsizing of the apparatus.

SUMMARY OF THE INVENTION

An aspect of the present invention is a differential apparatus having a pinion gear revolving around an axial line and a side gear engaging with the pinion gear and configured to transmit power by rotation of the side gear, including: a differential case housing the pinion gear and the side gear and rotating around the axial line; and an intermediate member disposed between the side gear and an inner wall of the differential case. The intermediate member has a scooping-up portion scooping up oil outside of the differential case.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described with reference to FIGS. 1 to 6B. A differential apparatus 60 according to the embodiment of the present invention is included in a power transmission apparatus 100 for use in vehicles. The power transmission apparatus 100 uses an electric motor 2 as the driving source of the vehicle and is mounted on a motor-driven vehicle, such as an electric vehicle or hybrid vehicle.

Figure 1:
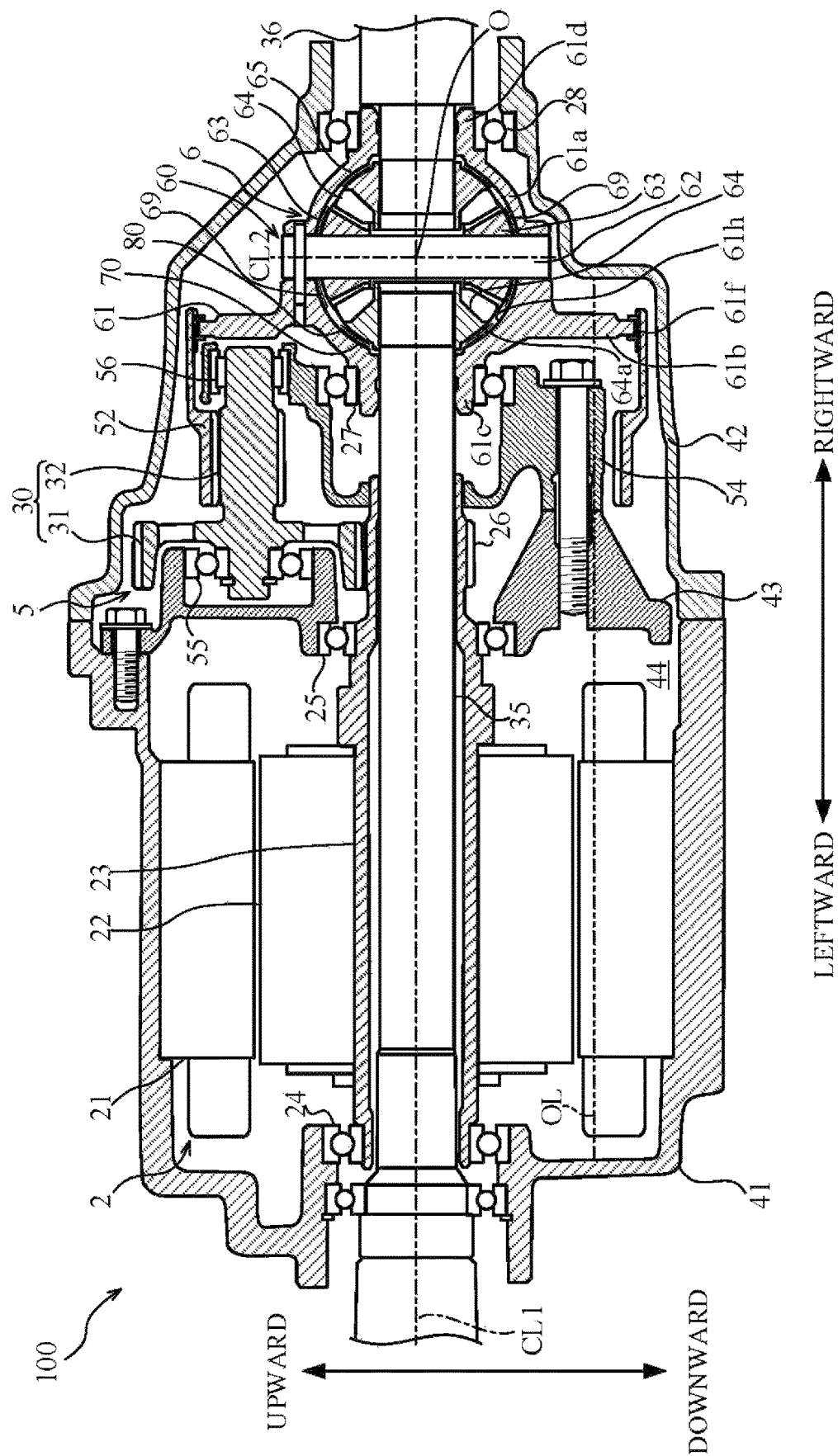
FIG. 1 is a sectional view showing a power transmission apparatus including a differential apparatus according to an embodiment of the present invention.

FIG. 1 is a sectional view showing the power transmission apparatus 100. First, referring to FIG. 1, the configuration of the power transmission apparatus 100 will be described. For convenience, the up-down direction and left-right direction are defined as shown in FIG. 1, and the configuration of the components will be described in accordance with these directions.

The electric motor 2, a reduction gear train 5, and the differential apparatus 60 are housed side by side in the left-right direction inside cases 41, 42 of the power transmission apparatus 100. The power of the electric motor 2 is reduced in speed and transmitted to the differential apparatus 60 by the reduction gear train 5 and distributed to a pair of left and right output shafts 35, 36 (axles) by the differential apparatus 60.

The electric motor 2 includes a stator 21, a rotor 22, and a rotor shaft 23. The rotor shaft 23 is supported by the case 41 and a holder 43 through bearings 24, 25 so as to be rotatable around the axial line CL1.

The reduction gear train 5 includes a rotor gear 26, a plurality of (three) counter gears 30, and a ring gear 52. The rotor gear 26 is formed on an axial end of the rotor shaft 23 and rotationally driven by the electric motor 2. Each counter gear 30 includes a large-diameter gear 31 engaged with the rotor gear 26 and a small-diameter gear 32 engaged with the ring gear 52. Both ends of the counter gear 30 are supported by the holder 43 and a holder 54 through bearings 55, 56 so as to be rotatable around an axial line parallel with the axial line CL1. An axially extending portion of the ring gear 52 is coupled to a differential case 61 of the differential apparatus 60. One journal 61c disposed on the differential case 61 is supported by the holder 54 through a bearing 27 so as to be rotatable around the axial line CL1. The other journal 61c disposed on the differential case 61 is supported by the case 42 through a bearing 28 so as to be rotatable around the axial line CL1.

The rotation of the rotor gear 26 is reduced in speed and transmitted to the differential case 61 by the counter gears 30 and ring gear 52. The counter gears 30 are formed so as to be circumferentially arranged and engaged with the ring gear 52 and thus the outer diameter of the reduction gear train 5 can be set so as to be equivalent to that of the electric motor 2. This allows the heights of the electric motor 2 and reduction gear train 5 to be made uniform in the left-right direction, allowing the space in the cases 41, 42 to be utilized efficiently.

The internal space of the cases 41, 42 is partitioned into a space containing the electric motor 2 and a space containing the reduction gear train 5 and differential apparatus 60 by the holders 43, 54. The bottoms of the cases 41, 42 form a storage 44, which is the internal space of the cases 41, 42. The storage 44 stores oil (liquid medium).

During a stop of rotation of the power transmission apparatus 100, the level of the oil stored in the storage 44 is located in a position OL shown in FIG. 1. During rotation of the power transmission apparatus 100, the oil stored in the storage 44 is scooped up by the counter gears 30, rotor 22, ring gear 52, differential case 61, differential apparatus 60, and the like, and the components in the cases 41, 42 are lubricated by the scooped-up oil. That is, the components in the power transmission apparatus 100 are lubricated by so-called natural lubrication without using a pump.

Next, referring to FIGS. 2 to 5, the lubrication structure of the differential apparatus 60 will be described. The terms "radial direction," "circumferential direction," and "axial direction" refer to a radial direction around the axial line CL1, a circumferential direction around the axial line CL1, and the extending direction of the axial line CL1, respectively. In FIGS. 2 to 5, a part of the power transmission apparatus 100 is omitted for simplification.

Figure 2:
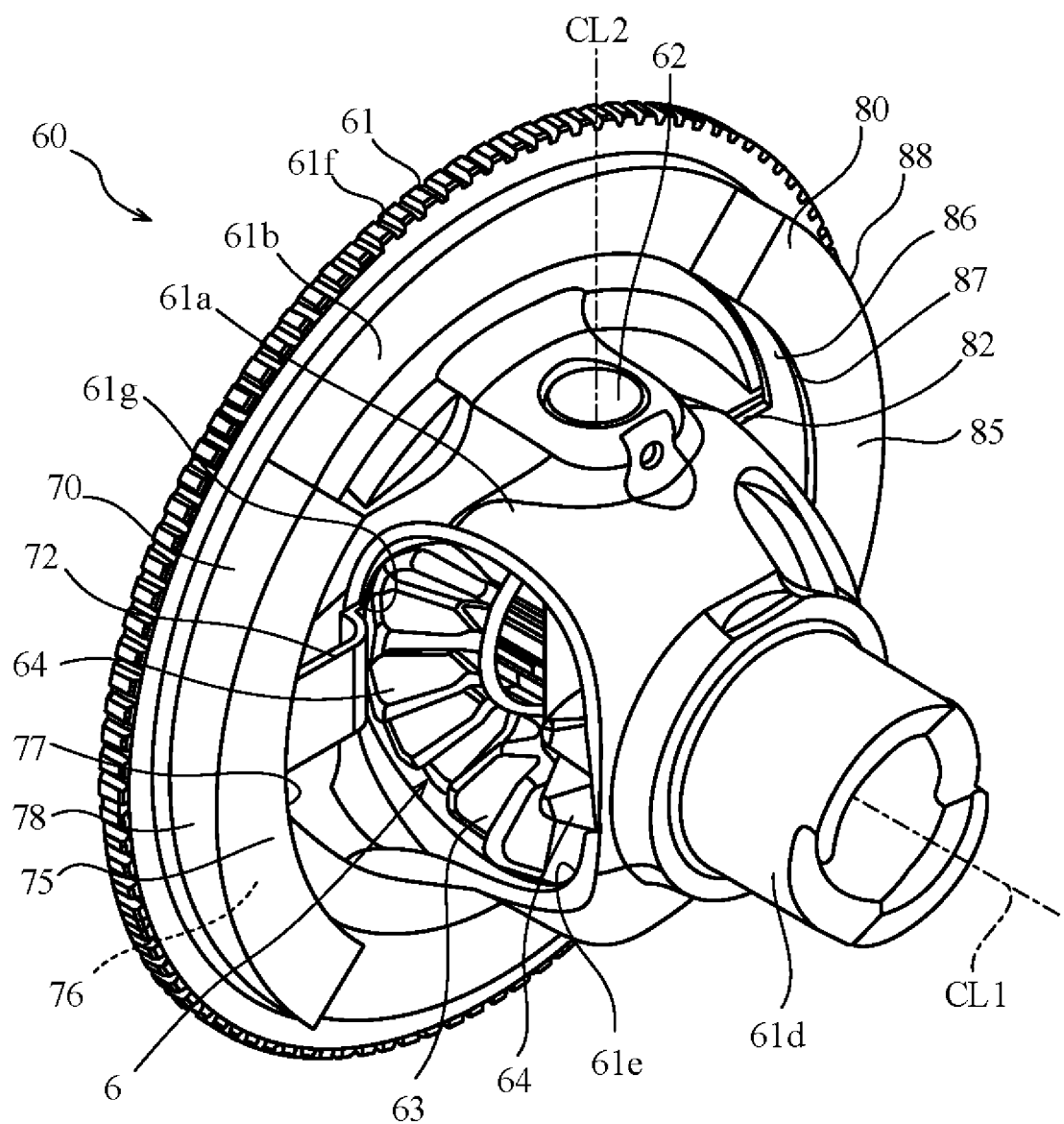
FIG. 2 is a perspective view showing the differential apparatus.

FIG. 2 is a perspective view showing the differential case 61 and differential mechanism 6. The differential case 61 includes a hollow housing 61a housing the differential mechanism 6, a flange 61b extending from the outer circumference of the housing 61a in a disc shape, and the journals 61c (FIG. 1), 61d extending cylindrically from both ends in the direction of the axial line CL1, of the housing 61a.

As shown in FIGS. 1 and 2, the housing 61a forms an approximately spherical space around the intersection O of the axial line CL1 and the axial line CL2 of pinions (to be discussed later) of the differential mechanism 6. As shown in FIG. 2, the housing 61a has a pair of windows 61e opened therein.

As shown in FIGS. 1 and 2, the flange 61b extends along a plane perpendicular to the axial line CL1, and the outer circumferential edge of the flange 61b is provided with a spline 61f coupled to the ring gear 52 (FIG. 1). Thus, the differential case 61 and differential mechanism 6 are coupled to the ring gear 52 and rotate with the ring gear 52 around the axial line CL1.

Figure 3A:
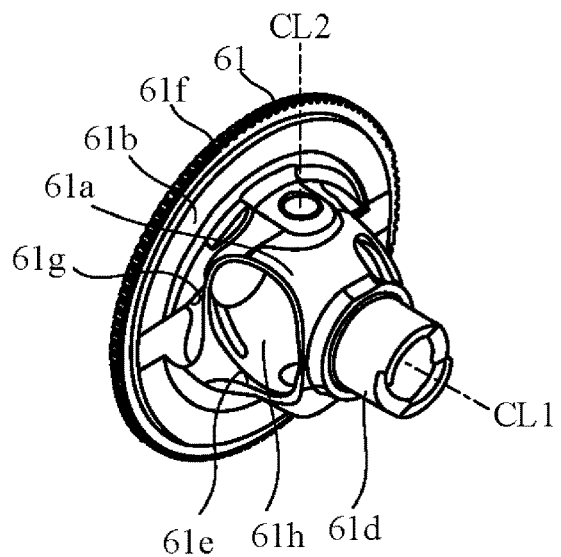
FIG. 3A is a perspective view showing a differential case of the differential apparatus of FIG. 2.
Figure 3B:
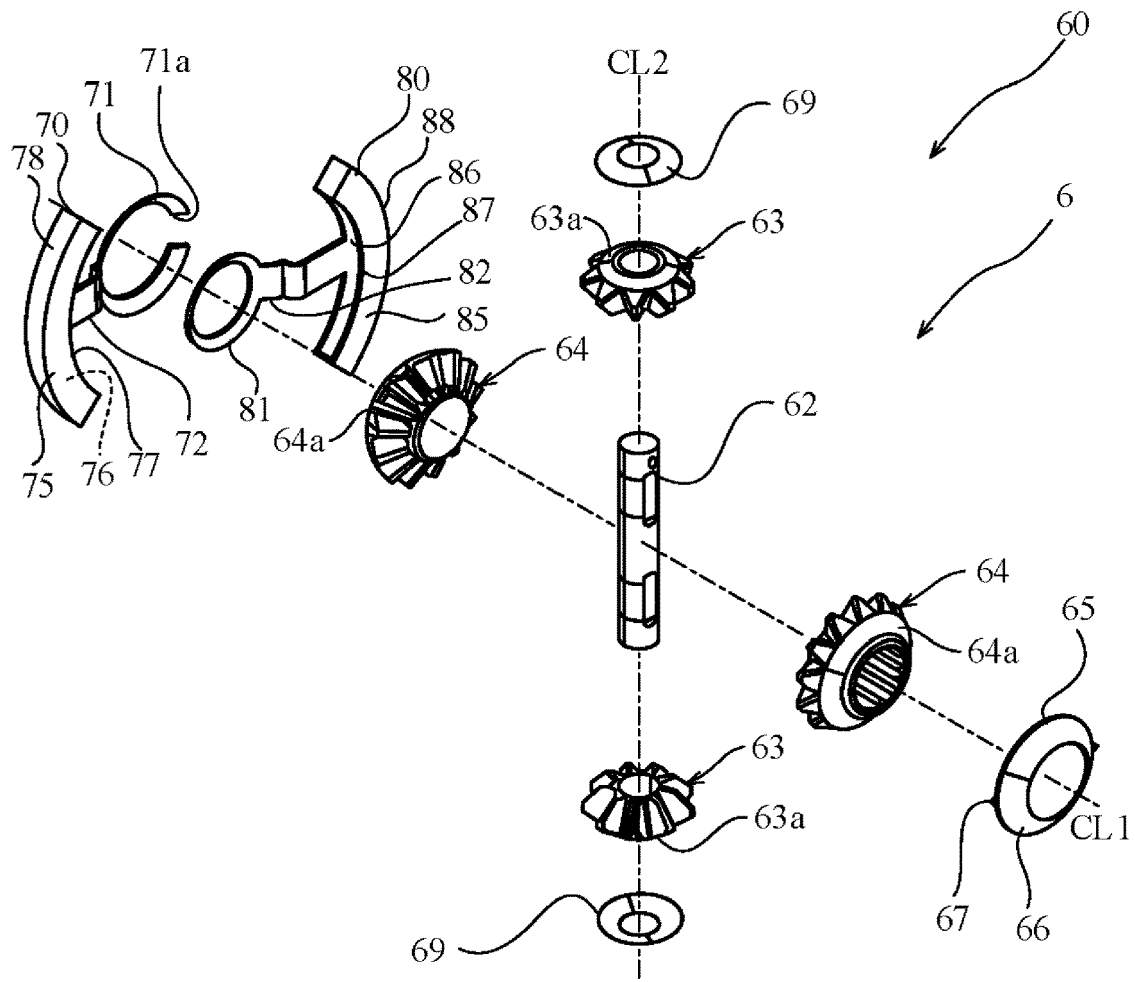
FIG. 3B is an exploded perspective view showing a differential mechanism housed in the differential case of FIG. 3A.

FIGS. 3A and 3B are perspective views showing the differential case 61 and exploded differential mechanism 6. FIG. 3A is a perspective view showing the differential case 61, and FIG. 3B is an exploded perspective view showing the differential mechanism 6 housed in the differential case 61. As shown in FIG. 3B, the differential mechanism 6 includes a pair of pinion gears 63 and a pair of side gears 64. The pair of pinion gears 63 are supported by the differential case 61 through a shaft 62 so as to be rotatable around the axial line CL2.

As shown in FIGS. 3A and 3B, the differential case 61 and shaft 62 rotate with the ring gear 52 (FIG. 1) around the axial line CL1. When the pair of upper and lower pinion gears 63 supported by the shaft 62 revolve around the axial line CL1, the pair of left and right side gears 64 engaged with the pair of upper and lower pinion gears 63 rotate around the axial line CL1. Thus, the power transmitted to the differential case 61 through the ring gear 52 is distributed to the pair of left and right output shafts 35, 36 (FIG. 1) coupled to the pair of left and right side gears 64.

Approximately partially hemispherical pinion washers 69 are disposed between the spherical inner wall 61h of the differential case 61 and the approximately partially hemispherical rear surfaces 63a of the pinion gears 63. These pinion washers prevent the pinion gears 63 from slidingly contacting the inner wall 61h of the differential case 61.

An approximately partially hemispherical side washer 65 is disposed between the inner wall 61h of the differential case 61 and the approximately partially hemispherical rear surface 64a of one side gear 64. Side washers 70, 80 (to be discussed later) are disposed between the inner wall 61h of the differential case 61 and the approximately partially hemispherical rear surface 64a of the other side gear 64. These side washers prevent the side gears 64 from slidingly contacting the inner wall 61h of the differential case 61.

The side washer 65 includes an annular (approximately partially hemispherical) washer portion 66 and a pair of detents 67 that protrude from the outer circumference of the washer portion 66. Since the detents 67 are engaged with the opening edges of the windows 61e, the rotation of the side washer 65 with respect to the differential case 61 is stopped.

Figure 4:
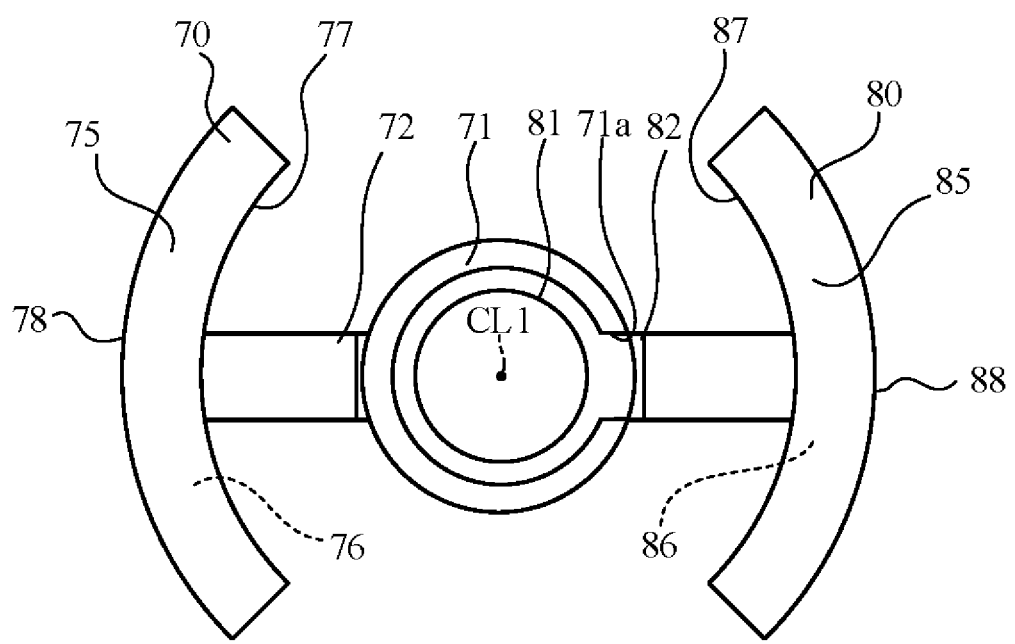
FIG. 4 is a front view showing side washers.
Figure 5:
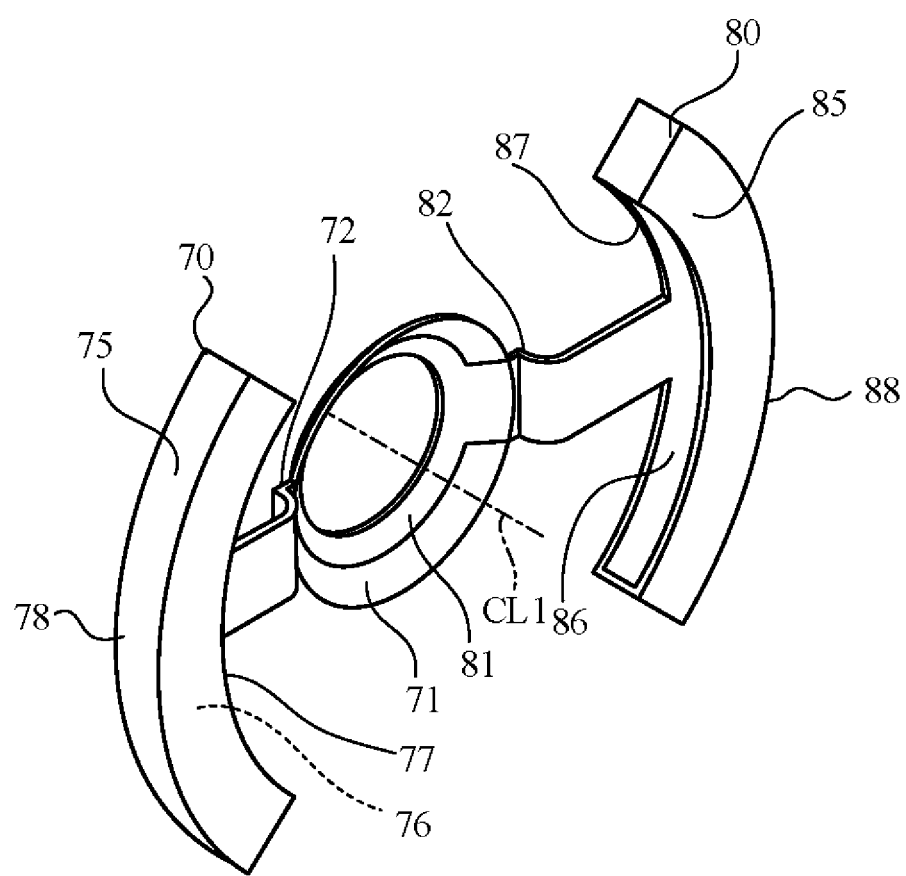
FIG. 5 is a perspective view showing side washers.

FIG. 4 is a front view showing the side washers 70, 80 seen from the right direction. FIG. 5 is a perspective view showing the side washers 70, 80. The side washers 70, 80 include annular (approximately partially hemispherical) washer portions 71, 81 disposed inside the differential case 61, tabular extensions 72, 82 extending from the washer portions 71, 81 through the windows 61e out of the differential case 61, and scoopers 75, 85 disposed on the front ends of the extensions 72, 82.

Since the washer portions 71, 81 are disposed between the spherical inner wall 61h of the differential case 61 and the approximately partially hemispherical rear surface 64a of the side gear 64, the washer portions 71, 81 are supported by the inner wall 61h of the differential case 61 and the rear surface 64a of the side gear 64 so as to be immovable in the radial direction of the approximately spherical housing 61a.

The pair of side washers 70, 80 are disposed such that the washer portions 71, 81 thereof are engaged with each other inside the housing 61a and the extensions 72, 82 thereof extend out of the housing 61a through the pair of windows 61e.

The washer portion 71 of one side washer 70 has an annular shape having a notch 71a, that is, a C-shape. The washer portion 81 of the other side washer 80 has an annular shape having no notch. The outer diameter of the washer portion 81 and the inner diameter of the washer portion 71 approximately match each other, and the washer portion 81 and washer portion 71 are disposed such that the washer portion 81 is disposed inside the washer portion 71 and the base end of the extension 82 is engaged with the notch 71a. Thus, the washer portions 71, 81 are disposed so as to contact the inner wall 61h of the differential case 61 alongside each other, without overlapping each other when seen from the right direction.

The differential case 61 includes a pair of engagement parts 61g (FIG. 3A) that are engaged with the extensions 72, 82 and stop the rotation of the side washers 70, 80. The tabular extensions 72, 82 of the side washers 70, 80 have a bent shape so as to be engaged with the engagement parts 61g. Thus, the differential case 61 is disposed such that the rear surfaces of the extensions 72, 82 closely contact the flange 61b, and the side washers 70, 80 rotate with the differential case 61 around the axial line CL1.

The scoopers 75, 85 of the side washers 70, 80 form gutters (bags) extending along the outer circumference of the flange 61b. The scoopers 75, 85 form oil storage spaces 76, 86, which are recesses oriented to the radial inside. Openings 77, 87 of the scoopers 75, 85 are opened along the inner circumference of the flange 61b so as to be opposed to the windows 61e of the differential case 61. Rear portions 78, 88 (outer circumferential portions) of the scoopers 75, 85 are formed as tabular portions that are bent along the outer circumference of the flange 61b. The side washers 70, 80 are disposed so as to be symmetric with respect to the axial line CL1.

Next, states in which lubrication is performed in the differential apparatus 60 will be described.

During rotation of the differential apparatus 60, the side washers 70, 80 rotate with the differential case 61, and the oil scooped up by the scoopers 75, 85 is supplied to the differential mechanism 6 through the windows 61e of the differential case 61. Thus, the differential mechanism 6 is lubricated.

Figure 6A:
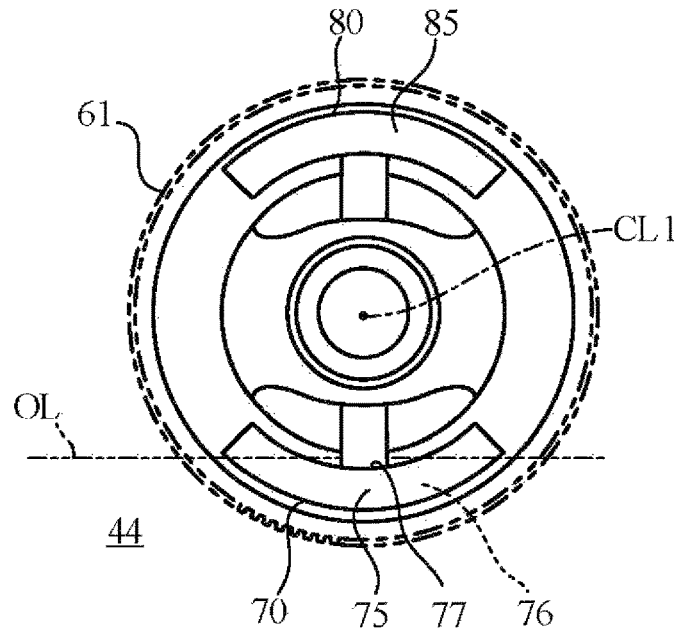
FIG. 6A is a drawing showing an example of lubrication performed in the differential apparatus.
Figure 6B:
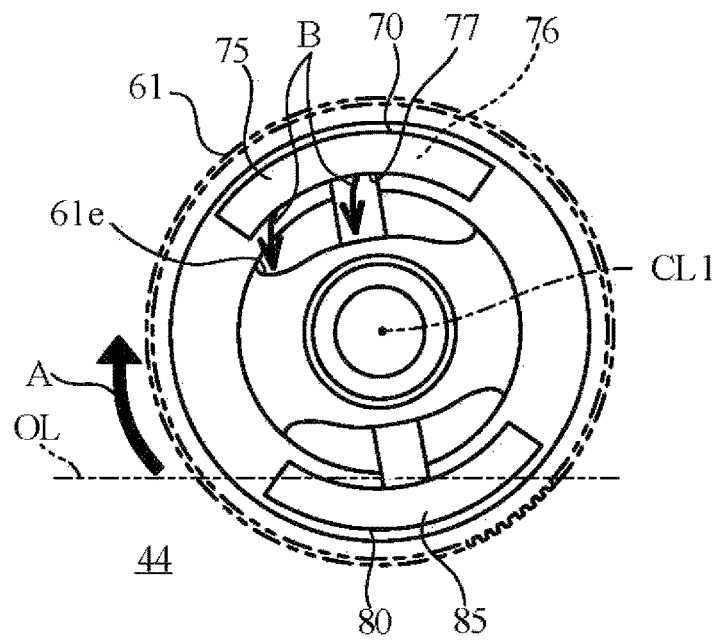
FIG. 6B is a drawing showing an example of lubrication subsequent to FIG. 6A.

FIGS. 6A and 6B are drawings showing an example of lubrication performed in the differential apparatus 60 during start and low-speed travel of the vehicle. Referring to these drawings, the flow of the oil will be described.

First, in a state shown in FIG. 6A, the scooper 75 of the side washer 70 located below is soaked in the oil stored in the storage 44, and the oil enters the oil storage space 76 through the opening 77.

Then, as shown in FIG. 6B, the side washer 70 located below is raised as the differential case 61 rotates in a direction shown by an arrow A. The oil in the oil storage space 76 flows out of the opening 77 as shown by an arrow B while receiving gravity, and flows down to the differential mechanism 6 in the housing 61a through the window 61e. Since the opening 77 is disposed so as to be opposed to the window 61e, the oil flowing out of the opening 77 while receiving gravity can be efficiently introduced into the differential mechanism 6 through the window 61e.

The scooper 85, oil storage space 86, and opening 87 of the side washer 80 have configurations similar to those of the scooper 75, oil storage space 76, and opening 77 of the side washer 70. For this reason, also when the side washer 80 is raised from below, the oil flowing out of the opening 87 can be introduced into the differential mechanism 6.

In an operation state in which the rotation speed of the differential case 61 is somewhat low, the lubrication of the differential mechanism 6 by stirring of the oil is insufficient. However, the oil that has entered the oil storage spaces 76, 86 is supplied to the differential mechanism 6 while receiving gravity. Thus, the differential mechanism 6 is sufficiently lubricated.

The present embodiment can produce the following advantageous effects:

(1) The differential apparatus 60 of the present embodiment includes the differential case 61 that houses the pinion gears 63 and side gears 64 and rotates around the axial line CL1 and the side washers 70, 80 disposed between the side gear 64 and the inner wall 61h of the differential case 61. The differential apparatus 60 transmits power by rotation of the side gears 64 engaged with the pinion gears 63 that revolve around the axial line CL1. The side washers 70, 80 include the scoopers 75, 85 that scoop up the oil outside the differential case 61 (FIGS. 2 to 5).

During rotation of the differential apparatus 60, the scoopers 75, 85 rotate with the differential case 61, and the oil scooped up by the scoopers 75, 85 is supplied to the differential mechanism 6 in the differential case 61. Thus, the differential mechanism 6 is lubricated. This is realized by deforming the side washers 70, 80. Thus, it is possible to prevent an increase in the number of components of the differential apparatus 60 and thus upsizing of the entire apparatus including the differential mechanism 6.

(2) The side washers 70, 80 further include the washer portions 71, 81 supported by the side gear 64 and the inner wall 61h of the differential case 61 and the extensions 72, 82 that extend from the washer portions 71, 81 through the windows 61e opened in the differential case 61 out of the differential case 61 and connect the washer portions 71, 81 and the scoopers 75, 85 (FIGS. 3A to 5).

Thus, during rotation of the differential apparatus 60, the scoopers 75, 85 rotate in positions radially remote from the windows 61e of the differential case 61 through the extensions 72, 82 and thus can scoop up the oil stored in the storage 44.

(3) The differential case 61 has the pair of windows 61e. The side washers 70, 80 include the pair of scoopers 75, 85, the pair of washer portions 71, 81, and the pair of extensions 72, 82 that extend from the pair of washer portions 71, 81 through the pair of windows 61e out of the differential case 61 and connect the pair of washer portions 71, 81 and the pair of scoopers 75, 85. The one washer portion 71 and the other washer portion 81 are engaged with each other (FIGS. 3A to 5).

Thus, during rotation of the differential apparatus 60, the oil is supplied by the pair of side washers 70, 80 extending through the pair of windows 61e. As a result, the amount of oil supplied to the differential mechanism 6 can be increased.

(4) The washer portions 71, 81 have annular shapes, and the inner diameter of the one washer portion 71 and the outer diameter of the other washer portion 81 approximately match each other.

(5) The one washer portion 71 has the notch 71a on the side opposite to the side on which the extension 72 extends.

Thus, the pair of washer portions 71, 81 can be disposed without overlapping each other.

(6) The differential case 61 includes the engagement parts 61g that are engaged with the extensions 72, 82 and stop the rotation of the side washers 70, 80 (FIG. 3A).

Thus, the side washers 70, 80 are disposed in predetermined positions of the differential case 61 without using a fastening tool.

(7) The scoopers 75, 85 form the oil storage spaces 76, 86, which are recesses oriented to the radial inside (FIGS. 4, 5).

Thus, in the differential apparatus 60, the oil stored in the oil storage spaces 76, 86 flows down by gravity as the differential case 61 rotates, and is supplied to the differential mechanism 6 through the windows 61e. As a result, differential mechanism 6 is lubricated.

A differential apparatus conceivable as a comparative example is one that includes a bucket mounted on the flange of a differential case and is configured such that oil stored in the space between the flange of the differential case and the bucket flows down to a differential mechanism. However, in this differential apparatus, the bucket is mounted on the differential case through a bolt or the like. This increases the number of components of the differential apparatus and the number of assembly steps, resulting in an increase in the production cost. Also, it is difficult to prevent occurrence of a gap between the flange of the differential case and the bucket.

Compared to the above comparative example, the differential apparatus 60 of the present embodiment is provided with the bag-shaped scoopers 75, 85 as parts of the side washers 70, 80. This prevents increases in the number of components and the number of assembly steps, avoiding an increase in the production cost. Also, the scoopers 75, 85 are formed integrally with the side washers 70, 80 and therefore any gap from which the oil leaks does not occur in the oil storage spaces 76, 86. Thus, the oil that has entered the oil storage spaces 76, 86 can be efficiently supplied to the differential mechanism 6.

In modifications of the side washers 70, 80, the scoopers 75, 85 are not limited to the bag-shaped ones that form the oil storage spaces 76, 86 and may be, for example, spoon-shaped ones that scoop up the oil.

While the example in which the differential apparatus 60 is applied to the power transmission apparatus 100 of the vehicle has been described, the differential apparatus of the present invention can also be applied to apparatuses that are not for use in vehicles.

The above embodiment can be combined as desired with one or more of the above modifications. The modifications can also be combined with one another.

According to the present invention, the scoopers rotate with the differential case and oil scooped up by the scoopers is supplied into the differential case to conduct lubrication. Since this can be realized by deforming side washers, it is possible to prevent an increase in the number of components of the differential apparatus and thus upsizing of the entire apparatus including the differential mechanism.

Above, while the present invention has been described with reference to the preferred embodiments thereof, it will be understood, by those skilled in the art, that various changes and modifications may be made thereto without departing from the scope of the appended claims.

What is claimed is:

1. A differential apparatus having a pinion gear revolving around an axial line and a side gear engaging with the pinion gear and configured to transmit power by rotation of the side gear, comprising:
    a differential case housing the pinion gear and the side gear and rotating around the axial line; and
    an intermediate member disposed between the side gear and an inner wall of the differential case, wherein
    the intermediate member has:
        a scooping-up portion scooping up oil from outside of the differential case;
        a supported portion supported by the side gear and the inner wall of the differential case; and
        a connecting portion extending from the supported portion to outside of the differential case through a window opened in the differential case and connecting the supported portion and the scooping-up portion.

2. The differential apparatus according to claim 1, wherein
    the differential case has a pair of the windows, wherein the intermediate member has:
        a pair of the scooping-up portions;
        a pair of the supported portions; and
        a pair of the connecting portions extending from the pair of supported portions to outside of the differential case through the pair of windows and connecting the pair of supported portions and the pair of scooping-up portions, wherein
        one and another of the pair of supported portions engage each other.

3. The differential apparatus according to claim 2, wherein
    the supported portion is formed annularly and an inner diameter of one of the pair of supported portions and an outer diameter of another of the pair of supported portions approximately match.

4. The differential apparatus according to claim 3, wherein
    the one of the pair of supported portions has a notch portion on a side opposing a side from which the connecting portion extends.

5. The differential apparatus according to claim 1, wherein
    the differential case has an engaging portion engaging with the connecting portion to stop rotation of the supported portion.

6. The differential apparatus according to claim 1, wherein
    the scooping-up portion forms an oil storage space recessed inward in a rotation radial direction of the differential case.

* * * * *